United States Patent
Yamamaru et al.

(10) Patent No.: US 8,740,283 B2
(45) Date of Patent: *Jun. 3, 2014

(54) ARRANGEMENT STRUCTURE FOR CHARGING PORT COVER

(75) Inventors: Junichi Yamamaru, Ebina (JP); Daisuke Takashima, Atsugi (JP); Masaaki Takagi, Isehara (JP); Masato Inoue, Kanagawa-ken (JP); Tooru Yamashita, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/820,585

(22) PCT Filed: Jul. 27, 2011

(86) PCT No.: PCT/JP2011/067090
§ 371 (c)(1),
(2), (4) Date: Mar. 4, 2013

(87) PCT Pub. No.: WO2012/043043
PCT Pub. Date: Apr. 5, 2012

(65) Prior Publication Data
US 2013/0152474 A1   Jun. 20, 2013

(30) Foreign Application Priority Data
Oct. 1, 2010  (JP) .................................. 2010-223845

(51) Int. Cl.
*B60K 1/04* (2006.01)
*H01R 13/74* (2006.01)
*B60L 11/18* (2006.01)
*E05D 7/04* (2006.01)

(52) U.S. Cl.
CPC ............. *E05D 7/04* (2013.01); *H01M 2220/20* (2013.01); *H01R 13/74* (2013.01); *Y02T 90/121* (2013.01); *Y02T 10/7088* (2013.01); *B60L 11/1818* (2013.01); *Y02T 90/14* (2013.01); *B60L 2270/32* (2013.01); *B60K 1/04* (2013.01); *Y02T 10/7005* (2013.01); *B60L 2270/34* (2013.01)
USPC ...................... 296/136.01; 296/97.22; 439/34

(58) Field of Classification Search
USPC ................. 296/97.22, 136.01; 220/86.2, 905; 174/67; 439/147, 345, 34
See application file for complete search history.

(56) References Cited

U.S. PATENT DOCUMENTS 4,537,437 A * 8/1985 Buccola ...................... 296/97.22
5,280,135 A   1/1994 Berlin et al.
(Continued)

FOREIGN PATENT DOCUMENTS

EP    0 694 433 A1    1/1996
(Continued)

OTHER PUBLICATIONS
European Extended Search Report, Feb. 14, 2014, 5 pages.

*Primary Examiner* — Jason S Morrow
(74) *Attorney, Agent, or Firm* — Foley & Lardner LLP (57) ABSTRACT

An arrangement structure for a charging port cover includes a charging port (15) having a charging inlet (21) in a charging port opening portion (17) provided on a vehicle body, and a lid (7) that covers the charging port opening portion and is openable and closable on the vehicle body. The arrangement structure further includes a charging port cover (35) attached to the lid in an opened state to cover open sections (16, 18) between the charging port opening portion and the lid. The lid is fixed to the vehicle body by hinges (5) in an openable and closable manner. The open sections are located in side portions of the lid and the charging port opening portion in an axis direction (X) of the hinges and in a front portion in a direction (Y) orthogonal to the axis direction of the hinges.

5 Claims, 12 Drawing Sheets

(56) References Cited

U.S. PATENT DOCUMENTS

| | | |
|---|---|---|
| 5,934,918 A | 8/1999 | Wuechner |
| 6,234,555 B1* | 5/2001 | Emmerich et al. ......... 296/97.22 |
| 7,056,145 B2* | 6/2006 | Campbell et al. ............ 439/373 |
| 7,648,384 B2* | 1/2010 | Desissard et al. ............. 439/367 |
| 2011/0151693 A1* | 6/2011 | Loo et al. ...................... 439/135 |
| 2011/0285165 A1* | 11/2011 | Baba et al. ................ 296/97.22 |
| 2011/0285166 A1* | 11/2011 | Baba et al. ................ 296/97.22 |
| 2013/0076059 A1* | 3/2013 | Zalan et al. ................ 296/97.22 |
| 2013/0077328 A1* | 3/2013 | Hook et al. ................... 362/459 |
| 2013/0089999 A1* | 4/2013 | Martin .......................... 439/345 |
| 2013/0153257 A1* | 6/2013 | Yamamaru et al. ............. 174/67 |
| 2013/0157485 A1* | 6/2013 | Yamamaru et al. ........... 439/147 |
| 2013/0196522 A1* | 8/2013 | Hara .............................. 439/136 |
| 2013/0206757 A1* | 8/2013 | Nagai et al. .................. 220/86.2 |
| 2013/0224969 A1* | 8/2013 | Sasaki et al. .................... 439/34 |

FOREIGN PATENT DOCUMENTS

| | | |
|---|---|---|
| FR | 2 754 644 A1 | 4/1998 |
| JP | 5-198336 A | 8/1993 |
| JP | 11-185861 A | 7/1999 |
| JP | 11-318004 A | 11/1999 |

\* cited by examiner

FIG. 12

ARRANGEMENT STRUCTURE FOR CHARGING PORT COVER

TECHNICAL FIELD

The present invention relates to an arrangement structure for a charging port cover attached to a charging port on a vehicle such as an electric vehicle during charging.

BACKGROUND ART

Vehicles such as electric vehicles and so-called hybrid vehicles are commonly provided with a charging port to charge an on-board battery. The charging port has a charging inlet connected to the on-board battery, and an openable and closable lid that covers the charging inlet. When the lid is open, a charging gun (a paddle) is inserted in the charging inlet to charge the battery (for example, refer to Patent Document 1).

CITATION LIST

Patent Literature

Patent Document 1: Japanese Patent Unexamined Publication No. H11-318004

SUMMARY OF INVENTION

However, it is difficult to prevent unwanted removal of the charging gun from the charging port because the lid stays open during charging.

The present invention has been made in view of the above-described conventional problem. It is an object of the present invention to provide an arrangement structure for a charging port cover capable of preventing unwanted interference with a charging gun when it is inserted in a charging inlet during charging.

An arrangement structure for a charging port cover according to an embodiment of the present invention includes a charging port having a charging inlet in a charging port opening provided on a vehicle body, and a lid that covers the charging port opening and is openable and closable on the vehicle body. The arrangement structure further includes a charging port cover attached to the lid in an opened state to cover open sections between the charging port opening and the lid. The lid is fixed to the vehicle body by hinges in an openable and closable manner. The open sections are located in side portions of the lid and the charging port opening in an axis direction of the hinges and in a front portion in a direction orthogonal to the axis direction of the hinges.

DESCRIPTION OF EMBODIMENTS

Hereinafter, an embodiment of the present invention will be explained in detail with reference to the drawings. Although the following embodiment exemplifies an electric vehicle, the present invention is also applicable to a so-called hybrid vehicle.

As shown in FIG. 1 to FIG. 4, a bumper 1 is provided along the width of the front portion of a vehicle. A hood 3 is provided on the rear side of the bumper 1 to cover a motor room. In the centre portion of the vehicle width direction on the front side of the hood 3, a lid 7 is provided such that it is openable and closable in a vertical direction (in a longitudinal direction) via lid-side hinges 5 provided on both sides of the lid 7. The lid 7 is formed approximately in a trapezoidal shape in a planar view having a rear edge 9 longer than a front edge 11. Side edges 13, 13 obliquely extend to the front edge 11 so that the lid 7 is formed in a forward tapered shape.

Figure 1:
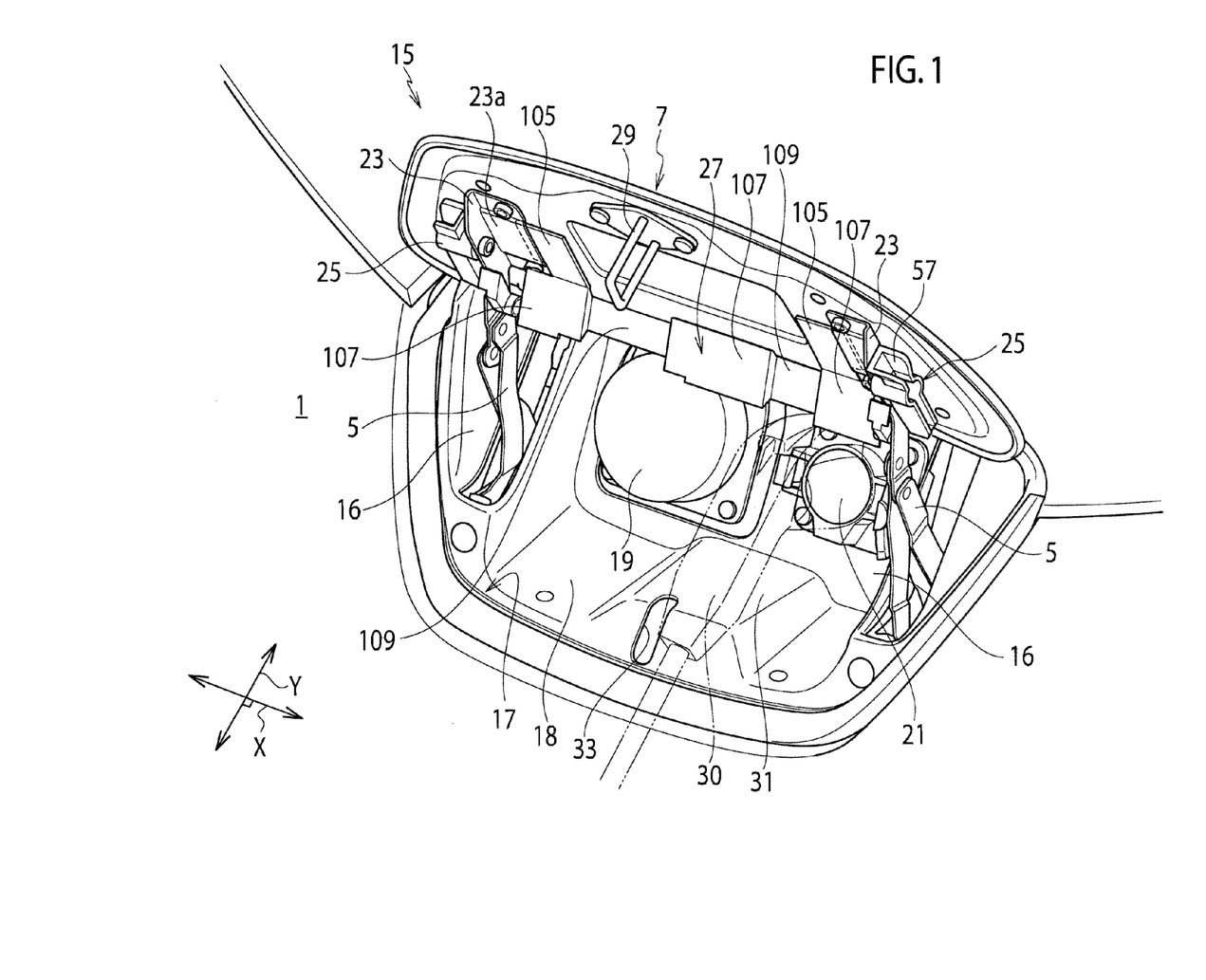
FIG. 1 is a perspective view showing a charging port provided in a front portion of a vehicle in a state in which a lid is open.

As shown in FIG. 1, a charging port 15 is provided in the front center portion of the bumper 1 in the vehicle width direction. The lid 7 is provided to cover a charging port opening portion 17 formed in the center of the bumper 1 in the vehicle width direction. The charging port opening portion 17 is provided (in the back of the charging port opening portion 17) with a quick charging inlet 19 towards the right of the vehicle (on the left of the figure), and provided with a normal charging inlet 21 towards the left of the vehicle (on the right of the figure). FIG. 1 shows a state in which a charging gun 30 is inserted in the normal charging inlet 21. It takes a long time to finish charging by the normal charging inlet 21, while the charging time is shortened by using the quick charging inlet 19.

A pair of brackets 23, 23 are formed in an L-shape in cross-section and fixed to the reverse side of the lid 7, and rail members 25, 25 described below are attached to the respective brackets 23, 23. A part 23a of the respective brackets 23 is formed in a convex shape so that a gap is provided between the underside of the lid 7 and the part 23a. A gap sealing member 27 described below is inserted in and held by these gaps. A lid-side striker (a lid-side engaging member) 29 is provided at the front end of the lid 7 in the center in the vehicle width direction and projects downward (from the underside of the lid 7). An elongated striker insertion hole 33 extending in the front-back direction is formed on a bottom surface 31 of the charging port opening portion 17 in the front center portion in the vehicle width direction. The lid-side striker 29 is formed in a U-shape as viewed from the side. The lid-side striker 29 enters the striker insertion hole 33 and engages with a vehicle body-side lock unit 34 (a vehicle body-side engaged member) shown in FIG. 11 when the lid 7 is closed.

Figure 3:
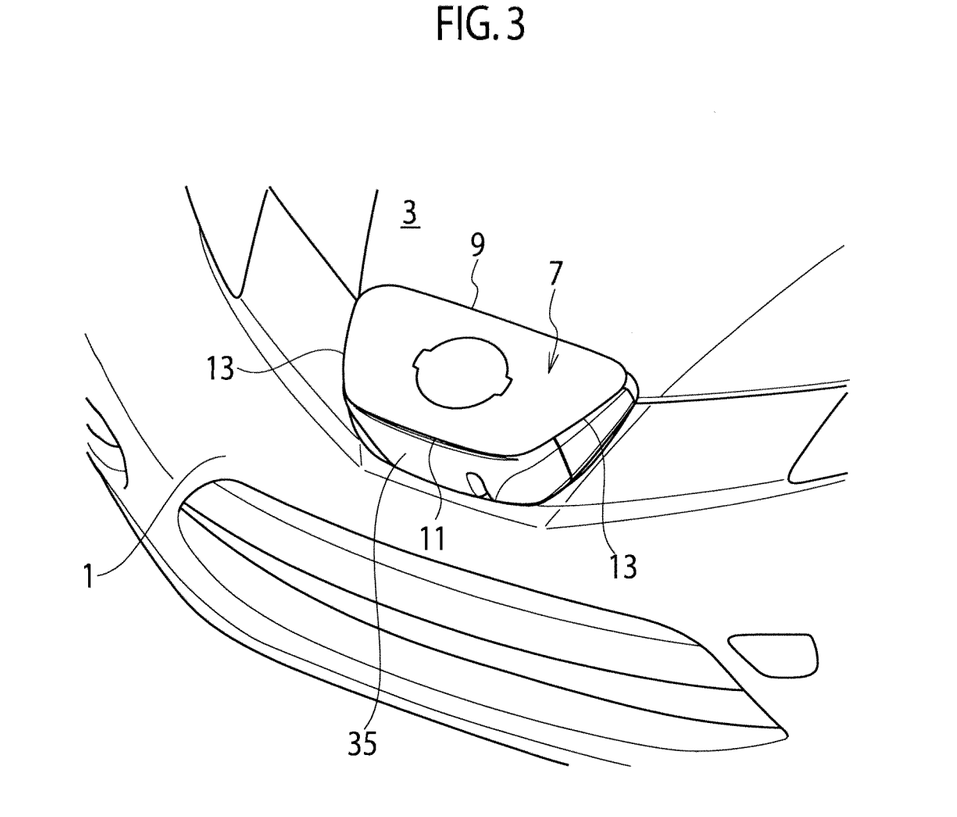
FIG. 3 is a perspective view showing a state in which the charging port cover is attached to the lid and the lid is then closed.
Figure 4:
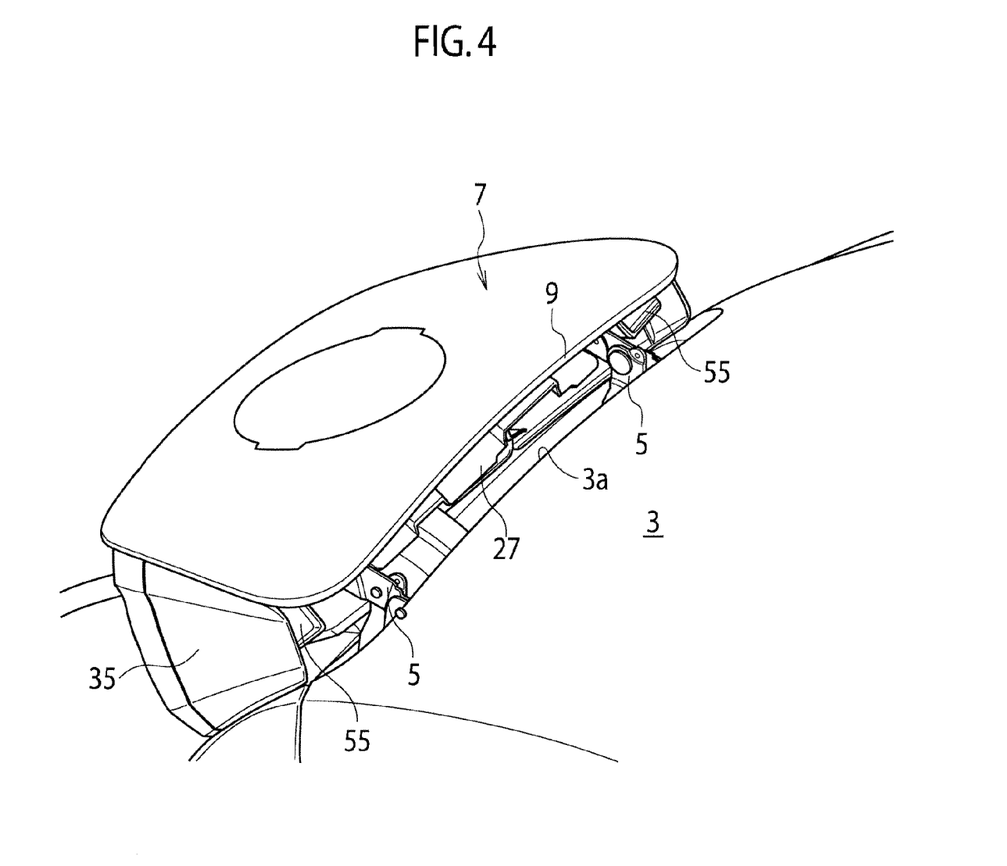
FIG. 4 is a rear perspective view of the lid in FIG. 3.

In the opened state of the lid 7 shown in FIG. 1, the front portion of the lid 7 is defined as a front open section 18, and both sides of the lid 7 are defined as open sections 16, 16. Thus, in a state in which a charging port cover 35 is attached to the lid 7 and the lid 7 is then closed (as shown in FIG. 3 and FIG. 4), the open sections 16 located on both sides of the charging port opening portion 17 in the axis direction X of the rotation axis of the lid-side hinges 5 (refer to FIG. 1), and the front open section 18 in front of the lid-side hinges 5 in the charging port opening portion 17 are covered with the charging port cover 35. Here, the axis direction X is the same as the axis direction of the rotation movement of the lid 7 via the lid-side hinges 5, which is the same as the vehicle width direction in the present embodiment.

As shown in FIG. 4, a gap is provided in the vertical direction between a hood front edge 3a and the rear edge 9 of the lid 7 to which the charging port cover 35 is attached. However, the gap sealing member 27 is provided in the lid 7 in order to prevent hands and tools from entering the inside of the charging port opening portion 17 via the gap.

Figure 2:
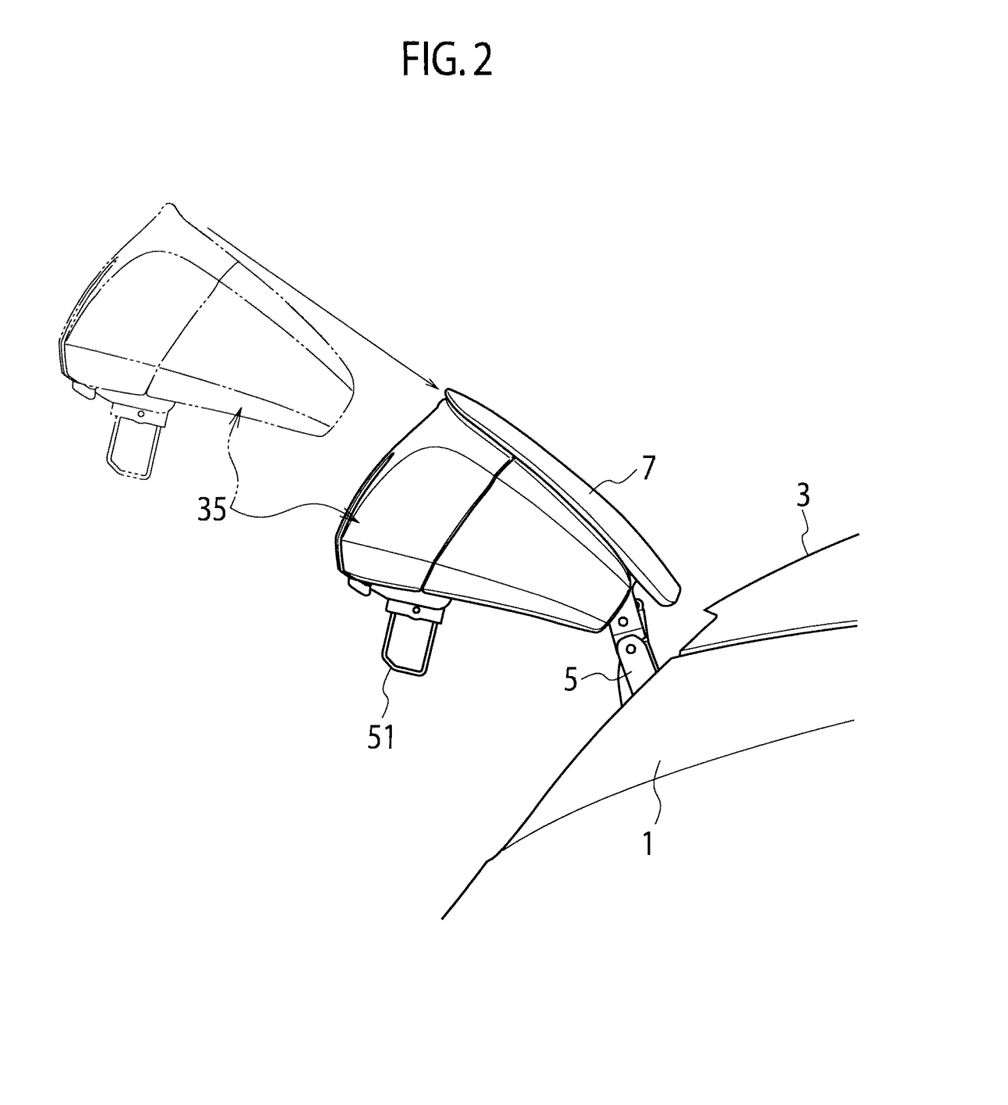
FIG. 2 is a side view showing a state in which a charging port cover according to an embodiment of the present invention is attached to the lid in FIG. 1.

FIG. 2 shows the fully-opened state of the lid 7 to which the charging port cover 35 is attached. As shown in FIG. 3, when a cover-side striker 51 of the charging port cover 35 attached to the lid 7 engages with the vehicle body-side lock unit 34, the lid 7 is in a state between a fully-opened state and a fully-closed state.

Figure 5:
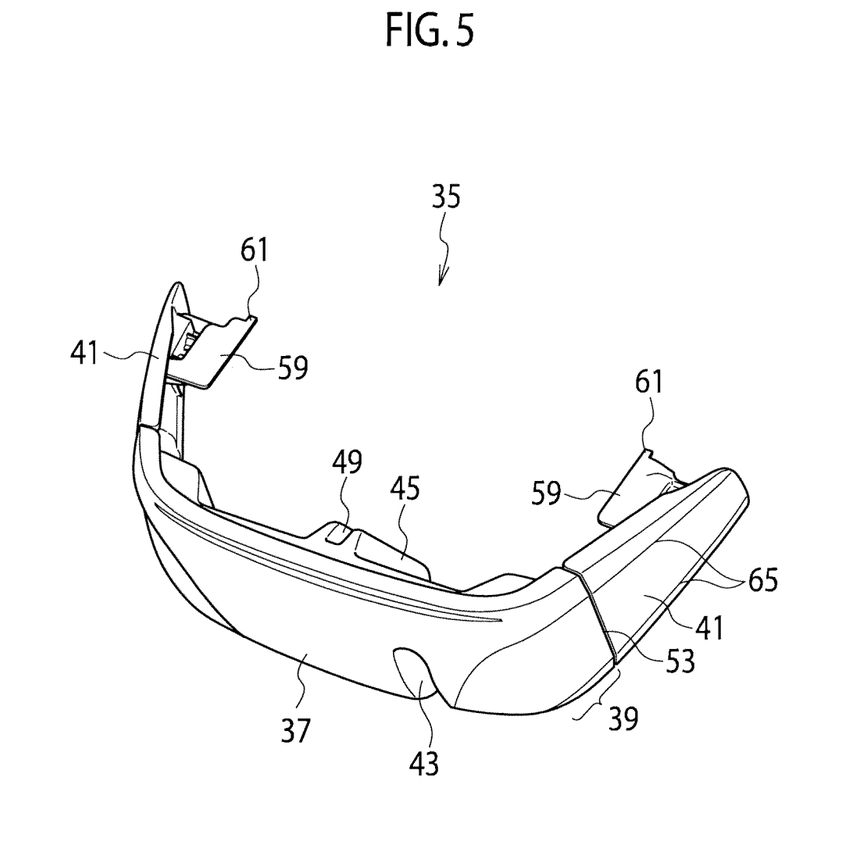
FIG. 5 is an upper front, perspective view of the charging port cover according to an embodiment of the present invention.
Figure 6:
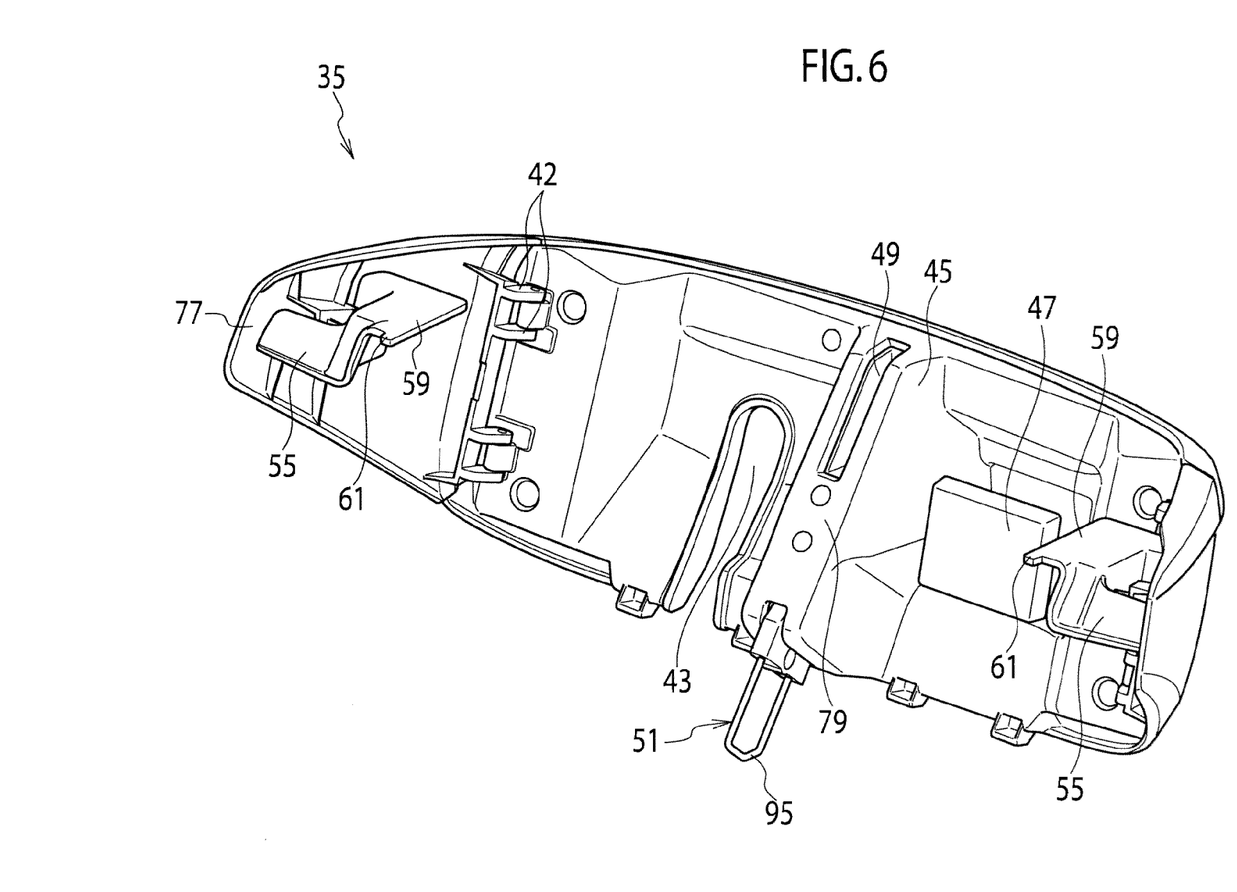
FIG. 6 is a rear perspective view of the charging port cover according to an embodiment of the present invention.

Next, the charging port cover 35 according to the present embodiment is explained below. The charging port cover 35 is formed approximately in a U-shape in a planar view as shown in FIG. 5 and FIG. 6. In other words, the charging port cover 35 has a front face section 37 located on the front side when attached to the vehicle, and curved sections 39, 39 bent backward from both sides of the front face section 37. The charging port cover 35 further has a pair of side face sections 41, 41 formed separately from the curved sections 39, 39 and extending backward from rear ends of the curved sections 39.

A charging cable cutout 43 is provided in the front face section 37 and vertically elongated from the bottom edge of the front face section 37 towards the left of the vehicle. The front face section 37 is also provided with a wall-like lock mechanism portion 45 projecting backward from the center (in the vehicle width direction) of the reverse side. A cable is inserted through the charging cable cutout 43 and is connected to the charging gun 30 (refer to FIG. 1) during a normal charge. The front face section 37 is further provided (on the reverse side towards the right of the vehicle) with a lock release lever 47 to release the engagement of the lock mechanism portion 45 and the lid-side striker 29 provided on the lid 7. That is, the charging cable cutout 43 and the lock release lever 47 are located on opposite sides of the lock mechanism portion 45. A striker insertion groove 49 is provided in the upper portion of the lock mechanism portion 45, and the lid-side striker 29 is inserted in the striker insertion groove 49. The cover-side striker (the cover-side engaging member) 51 projects downward from the lower end of the lock mechanism portion 45.

As shown in FIG. 5, the rear ends of the curved sections 39 of the charging port cover 35 serve as split portion 53 at which the side face sections 41 are bent inward from the curved sections 39. As shown in FIG. 6, the striker insertion groove 49 and the cover-side striker 51 in the charging port cover 35 are arranged vertically along an open-close track of the lid 7 in a state in which the charging port cover 35 is attached to the lid 7. The side face sections 41 are capable of turning inward with respect to the curved sections 39 via side face section hinges 42.

Figure 7:
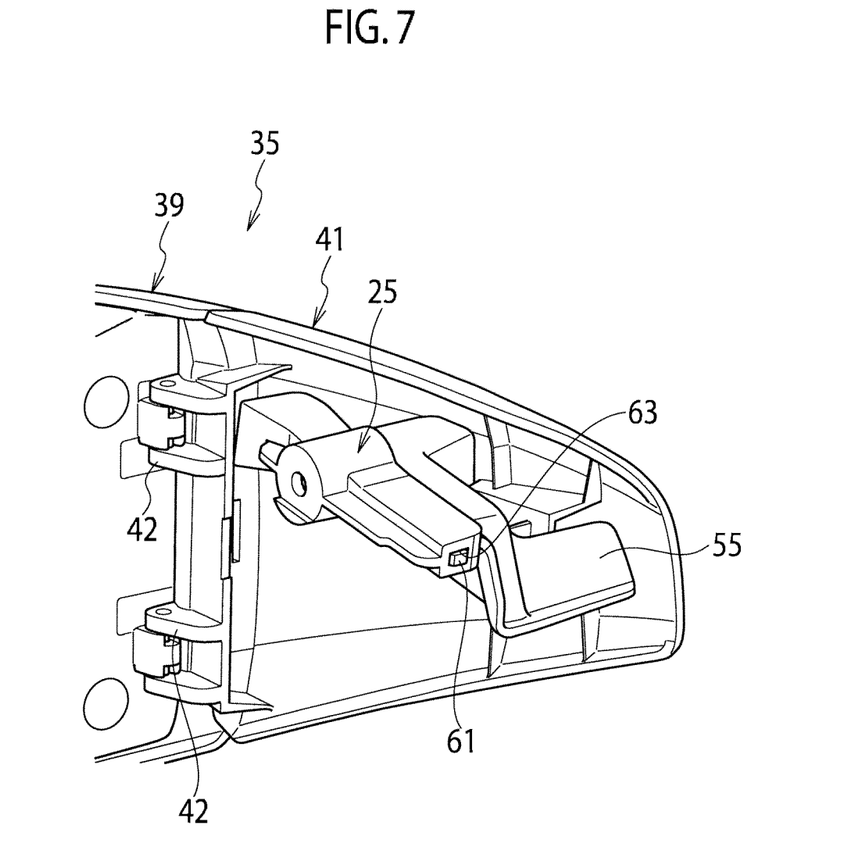
FIG. 7 is an enlarged perspective view showing the inside of a side portion of the charging port cover.

As shown in FIG. 6 and FIG. 7, shielding members 55 are provided inside the side face sections 41 and project inward (from the reverse side). The shielding members 55 prevent hands and tools from entering the gaps on both sides of the rear edge 9 of the lid 7, as shown in FIG. 4. The shielding members 55 have engaging portions 59 at their inner edges that are inserted in and engage with grooves 57 in the rail members 25 attached to the lid 7 (refer to FIG. 1). The engaging portions 59 are provided with lock protrusions 61 at end portions thereof. The shielding members 55, the engaging portions 59 and the lock protrusions 61 are integrally formed on the side face sections 41. As shown in FIG. 7, the lock protrusions 61 are fixed in lock holes 63 provided at end portions of the rail members 25.

Figure 8:
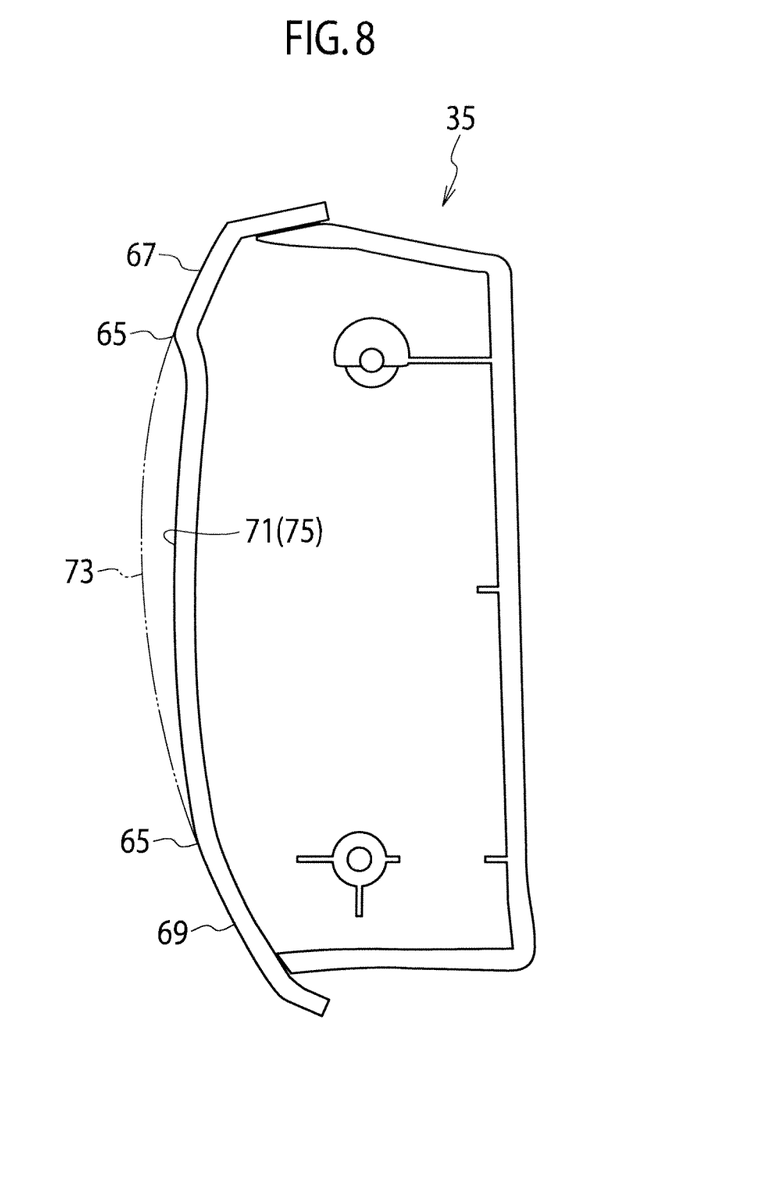
FIG. 8 is a cross-sectional view of a bent portion of the charging port cover.

Ridge lines 65 are formed in the charging port cover 35 at upper and lower portions along the front face section 37, the curved sections 39 and the side face sections 41 in the front-back direction as shown in FIG. 5. That is, for example, an upper end surface 67 and a lower end surface 69 in the curved section 39 shown in FIG. 8 are formed in an arc-like shape in cross-section. A intermediate surface 71 between the upper end surface 67 and the lower end surface 69 is a recessed portion 75 which is concave inward with respect to an arc-like two-dot chain line 73 connecting the upper end surface 67 and the lower end surface 69.

Figure 9:
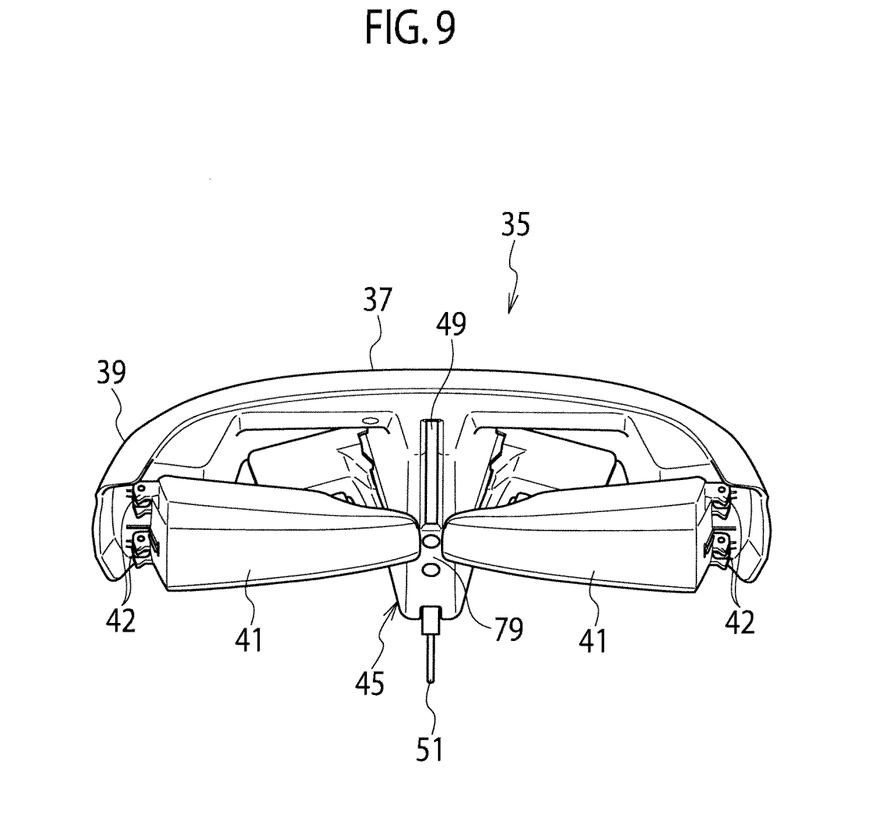
FIG. 9 is a rear perspective view of the charging port cover in a state in which the side portions are folded.

As shown in FIG. 6, the front surface of the lock mechanism portion 45 serves as a stopper surface 79 with which contact portions 77 provided at tips of the side face sections 41 come into contact. Namely, as shown in FIG. 9, in the fully-folded state of both side face sections 41, 41, the contact portions 77 of the side face sections 41 come into contact with the stopper surface 79 to keep the side face sections 41 folded.

Figure 10:
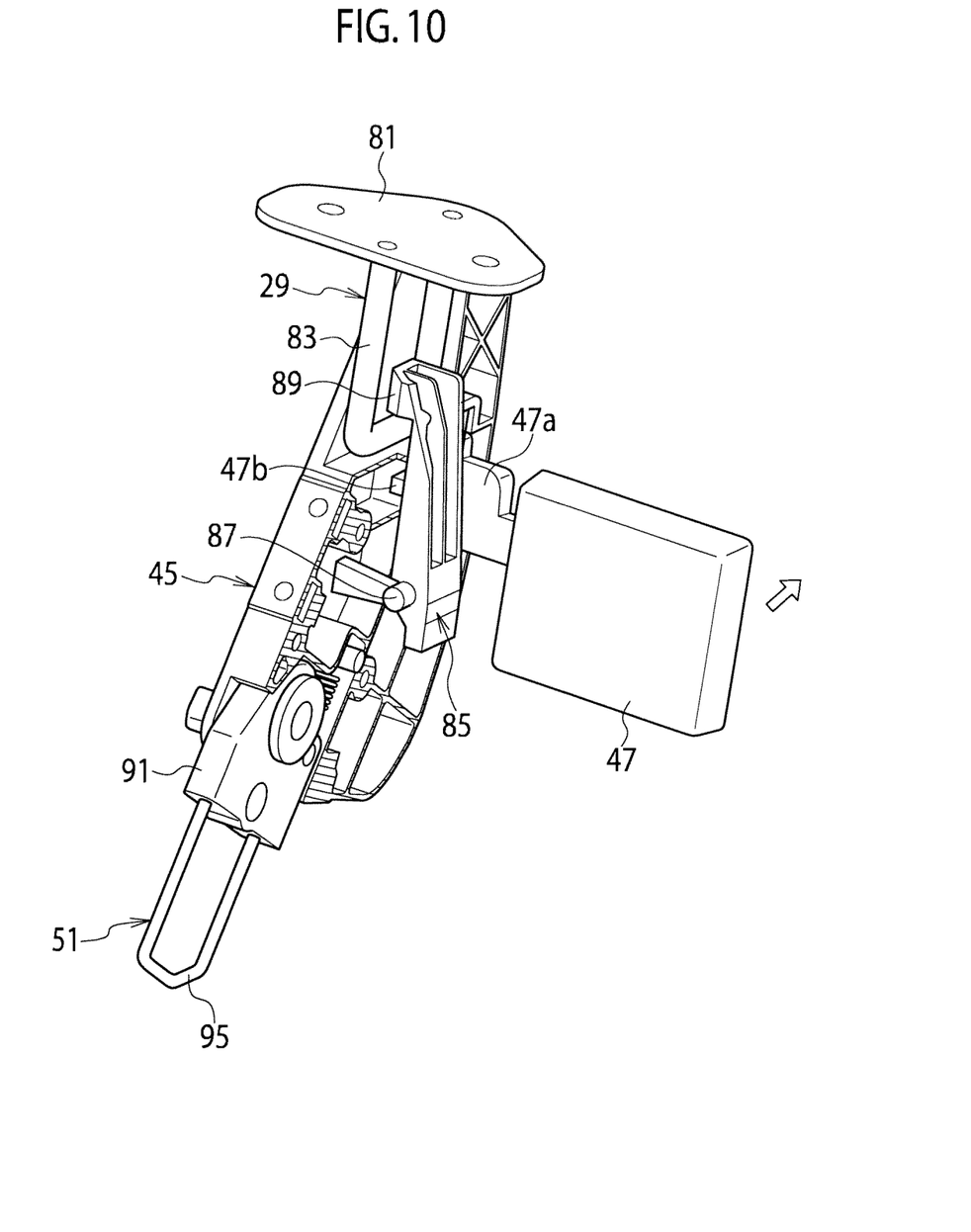
FIG. 10 is a perspective view of the mechanism in the charging port cover to engage the lid with a vehicle body.

As shown in FIG. 10, the lid-side striker 29 includes a support plate 81 fixed to the underside of the lid 7, and a striker body 83 formed in a U-shape as viewed from the side and projecting downward from the support plate 81. A lock member (a cover-side engaged member) 85 is rotatably fixed to the lock mechanism portion 45 in the charging port cover 35 and rotates in association with the lock release lever 47. The lower part of the lock member 85 is rotatably fixed to the lock mechanism portion 45 via a pin 87, and the upper part of the lock member 85 is provided with a hook portion 89 having a bent top. The lock member 85 is pushed by a torsion coil spring (not shown in the figure) placed in the pin 87 in a direction in which the striker body 83 is locked with the hook portion 89 as shown in FIG. 10.

The lock release lever 47 is integrally provided with an arm member 47a projecting toward the lock mechanism portion 45. A rotation support shaft (not shown in the figure) having an axis in the vertical direction is provided at the end portion of the arm member 47a and is rotatably supported by the housing of the lock mechanism portion 45. The arm member 47a is integrally provided with a lock member pressing portion 47b, which is bent approximately at a right angle to the arm member 47a and extending in the direction away from the front face section 37. A tip of the lock member pressing portion 47b comes into contact with the lock member 85. That is, the lock release lever 47 is integrally provided with the arm member 47a and the lock member pressing portion 47b, and is rotatable about the rotation support shaft (not shown in the figure) described above.

In a normal state, the striker body 83 of the lid-side striker 29 is locked with the hook portion 89 of the lock member 85. Once the lock release lever 47 is pushed in the direction indicated by the arrow in FIG. 10 (in a direction toward the front face section 37 of the charging port cover 35), the lock member pressing part 47b pushes and rotates the lock member 85 against the torsion coil spring (not shown in the figure). As a result, the hook portion 89 is released from the striker body 83.

Figure 11:
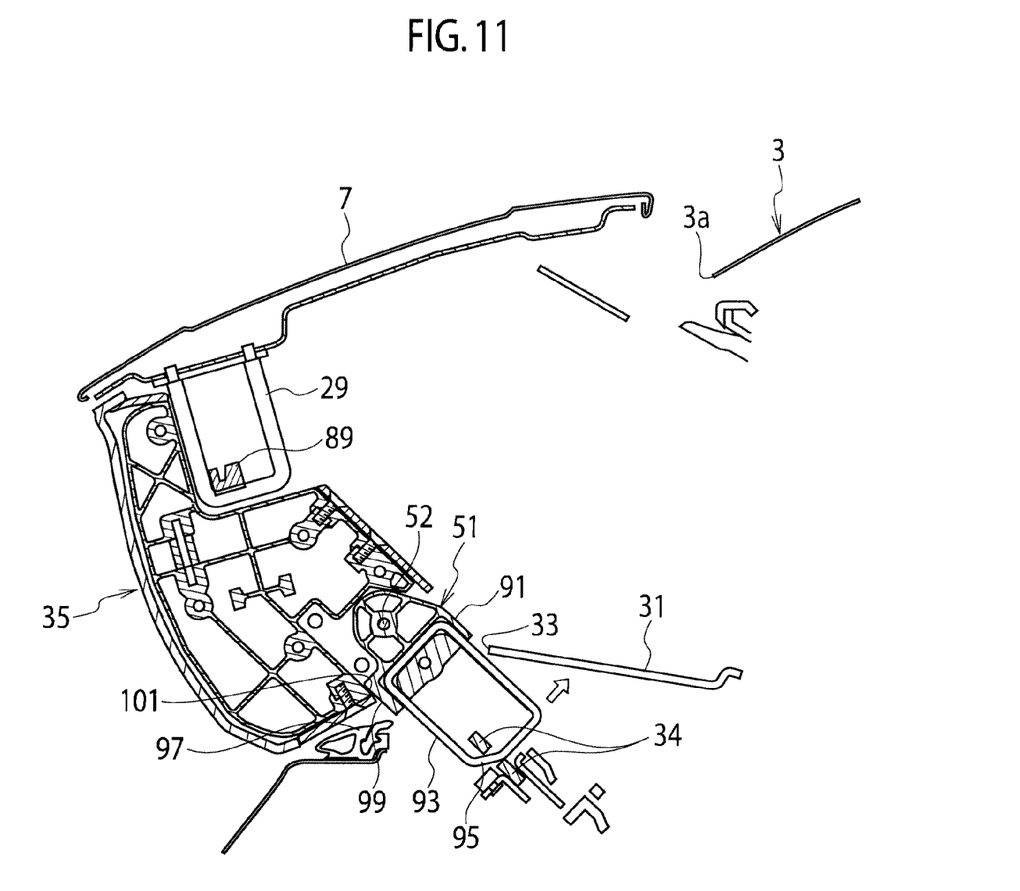
FIG. 11 is a cross-sectional view showing a closed state of the lid to which the charging port cover is attached.

As shown in FIG. 11, the cover-side striker 51 includes a holding bracket 91 made of resin, and a striker body 93 formed approximately in a square shape when viewed from the side and attached to the holding bracket 91. The striker body 93 rotates about a turning center 52 of the holding bracket 91. A lower corner 95 on the front side of the striker body 93 is recessed and deformed inward. The corner 95 comes into contact with an opening edge 97 on the vehicle body side when the charging port cover 35 attached to the lid 7 is closed. A front edge 99 of the holding bracket 91 comes into contact with a contact portion 101 in the lock mechanism portion 45. Therefore, the contact portion 101 prevents the holding bracket 91 from turning forward, while the holding bracket 91 is allowed to turn rearward. Thus, the cover-side striker 51 only turns rearward as indicated by the arrow in FIG. 11.

Figure 12:
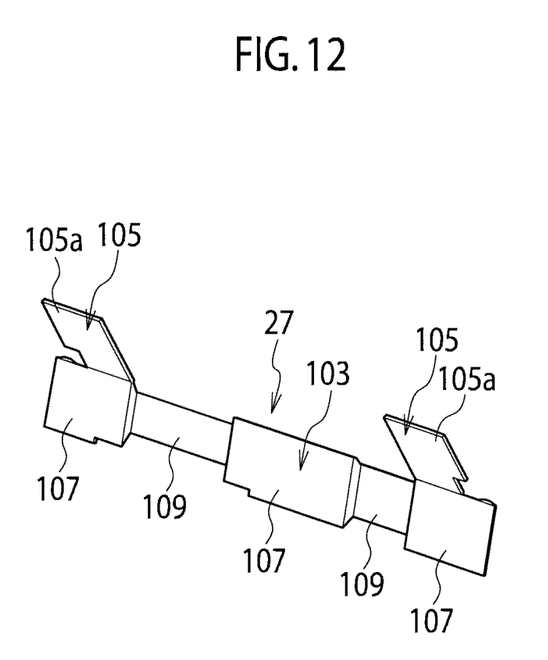
FIG. 12 is a perspective view showing a gap sealing member according to an embodiment of the present invention.

The gap sealing member 27 shown in FIG. 12 is formed as an elastic plate made of resin. The gap sealing member 27 is integrally provided with a main part 103 elongated in a horizontal direction, and a pair of lock portions 105, 105 provided on both sides of the main part 103 and extending upward. The main part 103 includes normal surfaces 107 provided in the middle and both end portions thereof, and recessed surfaces 109 provided between the respective normal surfaces 107. The recessed surfaces 109 are concave to the back (rearward of the vehicle) from the normal surfaces 107 in a state in which the gap sealing member 27 is attached to the lid 7. The recessed surface 109 on the left of the figure serves as a clearance part for the charging gun for a quick charge when the charging gun is inserted in the quick charging inlet 19. The recessed surface 109 on the right of the figure serves as a clearance part for the charging gun 30 for a normal charge when the charging gun 30 is inserted in the normal charging inlet 21. Each end portion 105a of the lock portions 105 fits in the gap between the underside of the lid 7 and each bracket 23 to hold the gap sealing member 27 as described above.

The following is an explanation of the charging operation by use of the normal charging inlet 21. It takes a long time to finish charging a battery mounted on the vehicle (not shown in the figure) using this method. First, in a state in which the lid 7 is closed, once the locked state of the lid-side striker 29 and the vehicle body-side lock unit 34 (refer to FIG. 11) is released by operating the lock release lever inside the vehicle, the lid 7 is fully open as shown in FIG. 1. The charging gun 30 is then inserted in the normal charging inlet 21 to start charging the battery while keeping the lid 7 fully-open.

Then, the charging port cover 35 is attached to the lid 7 as shown in FIG. 2 while the charging gun 30 is inserted in the normal charging inlet 21 and the side face sections 41, 41 are stretched out with respect to the front face section 37 as shown in FIG. 5. At the same time, the engaging portions 59 in the charging port cover 35 shown in FIG. 6 are inserted in and engage with the grooves 57 of the rail members 25 shown in FIG. 1. At the point of inserting the engaging portions 59, the lock release lever 47 shown in FIG. 6 and FIG. 10 is pushed against the reverse side of the front face section 37. This pushing force turns the lock release lever 47 such that the lid-side striker 29 and the lock member 85 are disengaged and in a released state.

After the engaging portions 59 in the charging port cover 35 are inserted in the grooves 57 of the rail members 25, the pushing force on the lock release lever 47 is released. In turn, the lock member 85 is released from the pressure applied from the lock member pressing portion 47b provided at the end portion of the lock release lever 47. As a result, the lock member 85 is turned by the torsion coil spring (not shown in the figure) so that the striker body 83 is locked with the hook portion 89 as shown in FIG. 10.

For example, the lock release lever 47 is pushed against the reverse side of the front face section 37 in such a manner that both sides of the lock mechanism portion 45 in the front face section 37 of the charging port cover 35 are held by both hands from below. Here, the thumbs of the hands are placed on the front side of the front face section 37 and the other four fingers of the respective hands are placed on the reverse side of the front face section 37, so that the lock release lever 47 may be pushed by at least one of the four fingers on the reverse side. Accordingly, the lock release lever 47 can be easily released by the simple process in which the charging port cover 35 is held by the thumb placed on the front side and the four fingers placed on the reverse side.

After the charging port cover 35 is attached to the lid 7 in the locked state, the lid 7 is closed together with the charging port cover 35 as shown in FIG. 3 and FIG. 4. When the charging port cover 35 is closed, the corner 95 of the striker body 93 in the cover-side striker 51 comes into contact with the opening edge 97 on the vehicle body side. By this contact, the cover-side striker 51 rotates about the turning center 52 in the direction indicated by the arrow in FIG. 11 and passes over the opening edge 97 to enter the striker insertion hole 33. The cover-side striker 51 is then locked with the vehicle body-side lock unit 34.

While the lid 7 is in a half-opened state between the fully-opened state and the fully-closed state as shown in FIG. 11, the charging port cover 35 covers the open sections 16 and 18 between the lid 7 and the vehicle body such as the bumper 1. Accordingly, it is possible to prevent unwanted hands and tools from entering the charging port opening portion 17 during a long charge, especially during the night.

While charging the battery, the shielding members 55 provided in the charging port cover 35 prevent hands and tools from entering the charging port opening portion 17 via the gaps in the corners on both sides of the rear edge 9 of the lid 7 as shown in FIG. 4. The gap sealing member 27 provided in the lid 7 also prevents hands and tools from entering the charging port opening portion 17 via the gap between the rear edge 9 of the lid 7 and the hood front edge 3a.

After the battery is charged, the locked state of the vehicle body-side lock unit 34 and the cover-side striker 51 in the charging port cover 35 shown in FIG. 11 is released by operating the lock release lever inside the vehicle. By releasing the locked state, the lid 7 is released together with the charging port cover 35.

Then, the charging port cover 35 is removed from the lid 7 by reversing the operating procedure for attaching the charging port cover 35 to the lid 7 shown in FIG. 2. After the removal of the charging port cover 35, the charging gun 30 shown in FIG. 1 is removed from the normal charging inlet 21, the normal charging inlet 21 is covered with a cap (not shown in the figure), and the lid 7 is then closed.

The side face sections 41, 41 of the removed charging port cover 35 shown in FIG. 5 are folded against the reverse side of the front face section 37 as shown in FIG. 9. The contact portions 77 at the tips of the side face sections 41, 41 come into contact with the stopper surface 79 of the lock mechanism portion 45, and the side face sections 41 are kept in the folded position.

The following are effects obtained according to the embodiment of the present invention.

(1) The arrangement structure for the charging port cover according to the present embodiment includes the charging port 15 formed in the bumper (the vehicle body) 1 having the normal charging inlet (the charging inlet) 21 in the charging port opening portion 17, and the openable and closable lid 7 to cover the charging port opening portion 17. The arrangement structure further includes the charging port cover 35 for covering the open sections 16 and 18 between the charging port opening portion 17 and the opened lid 7. The lid 7 is fixed to the vehicle body by the hinges 5, 5 in an openable and closable manner. The open sections 16 and 18 are located on both sides of the lid 7 in the axis direction X of the hinges 5, 5 and in the front portion of the lid 7 in the direction Y orthogonal to the axis direction X of the hinges 5, 5, respectively.

Therefore, when the charging gun 30 is inserted in the normal charging inlet 21 while charging the battery, the open sections in the front portion and on each side (as defined by the charging port opening portion 17 and the lid 7) can surely be covered with the charging port cover 35. Accordingly, it is possible to prevent unwanted hands and tools from entering the inside of the charging port 15 while charging the battery.

According to the present invention, front and side definitions of the lid 7 do not necessarily correspond to those in the vehicle. For example, in a case where the lid 7 is provided on the side surface of the vehicle, and the front portion of the lid 7 in the front-back direction is rotatably supported by the hinge 5, an open section towards the rear side of the lid 7 and open sections in upper and lower portions of the lid 7 are covered with the charging port cover 35.

(2) The charging port cover 35 is provided for covering the open sections defined by the charging port opening portion 17 and the lid 7 while the lid 7 is in an intermediate state between the fully-opened state and the fully-closed state.

As described above, the charging port cover 35 covers the open sections not in the state in which the lid is fully open but in the intermediate state between the fully-opened state and the fully-closed state. Therefore, the charging port cover 35 is prevented from increasing in size and as a result, cost savings can be realized.

(3) The lid 7 is provided with the lid-side striker 29 serving as a lid-side engaging member. In addition, the charging port opening portion 17 is provided, inside the peripheral edge thereof, with the vehicle body-side lock unit 34 serving as a vehicle body-side engaged member to engage with the lid-side striker 29. The charging port cover 35 includes the lock member 85 serving as a cover-side engaged member to engage with the lid-side striker 29, and the cover-side striker 51 serving as a cover-side engaging member to engage with the vehicle body-side lock unit 34 of the charging port opening portion 17.

Therefore, it is not necessary to provide a lock mechanism for the charging port cover 35 in the lid 7 or in the vehicle body.

(4) The lock member (the cover-side engaged member) 85 and the cover-side striker (the cover-side engaging member) 51 in the charging port cover 35 are arranged along the open-close direction of the lid 7 in the state in which the charging port cover 35 is attached to the lid 7.

Therefore, it is possible to engage the lid 7 with the charging port cover 35 and engage the charging port cover 35 with the vehicle body-side lock unit 34 by closing the lid 7. Accordingly, the charging port cover 35 can be easily attached to the lid 7.

(5) The cover-side striker (the cover-side engaging member) 51 in the charging port cover 35 is provided such that it can rotate toward the hinges 5 of the lid 7 in the state in which the charging port cover 35 is attached to the lid 7.

Therefore, when the charging port cover 35 is attached to the lid 7 and is then moved in the closing direction, the cover-side striker 51 rotates toward the hinges 5 if the cover-side striker 51 comes into contact with the striker insertion hole 33. Thus, the engagement of the cover-side striker 51 and the vehicle body-side lock unit 34 is not prevented.

The entire content of Japanese Patent Application No. P2010-223845 (filed on Oct. 1, 2010) is herein incorporated by reference.

Although the present invention has been described above by reference to the embodiment, the present invention is not limited to the description thereof, and it will be apparent to a person skilled in the art that various modifications and improvements can be made within the scope of the present invention.

INDUSTRIAL APPLICABILITY

According to the present invention, when the charging gun is inserted into the charging inlet when charging the battery, the open sections in the front portion and on both sides of the area defined by the charging port opening portion and the lid can surely be covered with the charging port cover. Therefore, it is possible to prevent unwanted hands and tools from entering the charging port opening portion while charging the battery.

REFERENCE SIGNS LIST

1 Bumper (vehicle body)
3 Hood
5 Lid-side hinge (hinge)
7 Lid
15 Charging port
16, 18 Open section
17 Charging port opening portion
21 Normal charging inlet (charging inlet)
29 Lid-side striker (lid-side engaging member)
30 Charging gun
34 Vehicle body-side lock unit (vehicle body-side engaged member)
35 Charging port cover
51 Cover-side striker (cover-side engaging member)
85 Lock member (cover-side engaged member)

The invention claimed is:

1. An arrangement structure for a charging port cover, comprising:
   a charging port having a charging inlet in a charging port opening portion provided on a vehicle body;
   a lid that covers the charging port opening portion and is openable and closable on the vehicle body; and
   a charging port cover attached to the lid in an opened state to cover open sections between the charging port opening portion and the lid,
   wherein the lid is fixed to the vehicle body by a hinge in an openable and closable manner, and
   the open sections are located in a side portion of the lid and the charging port opening portion in an axis direction of the hinge and in a front portion in a direction orthogonal to the axis direction of the hinge.

2. The arrangement structure for the charging port cover according to claim 1, wherein the charging port cover covers the open sections defined by the charging port opening portion and the lid in a state in which the lid is located in an intermediate position between a fully-opened state and a fully-closed state.

3. The arrangement structure for the charging port cover according to claim 1, wherein the lid is provided with a lid-side engaging member, and the vehicle body is provided with a vehicle body-side engaged member that engages with the lid-side engaging member, and the charging port cover includes a cover-side engaged member that engages with the lid-side engaging member of the lid, and a cover-side engaging member that engages with the vehicle body-side engaged member.

4. The arrangement structure for the charging port cover according to claim 1, wherein a cover-side engaged member and a cover-side engaging member in the charging port cover are arranged along an open-close direction of the lid in a state in which the charging port cover is attached to the lid.

5. The arrangement structure for the charging port cover according to claim 1, wherein a cover-side engaging member in the charging port cover is provided such that it can rotate toward the hinge in the state in which the charging port cover is attached to the lid.

* * * * *